United States Patent
Seekell

(10) Patent No.: US 10,998,700 B1
(45) Date of Patent: May 4, 2021

(54) BLOCK CONNECTOR AND BASE

(71) Applicant: Robert R. Seekell, Kuna, ID (US)

(72) Inventor: Robert R. Seekell, Kuna, ID (US)

( * ) Notice: Subject to any disclaimer, the term of this patent is extended or adjusted under 35 U.S.C. 154(b) by 0 days.

(21) Appl. No.: 16/719,800

(22) Filed: Dec. 18, 2019

(51) Int. Cl.
  *H02G 1/04* (2006.01)
  *H01R 4/64* (2006.01)
  *H02G 7/20* (2006.01)

(52) U.S. Cl.
  CPC ............... *H02G 1/04* (2013.01); *H01R 4/64* (2013.01); *H02G 7/205* (2013.01)

(58) Field of Classification Search
  CPC ............ H02G 1/04; H02G 7/205; H02G 7/00; H02G 7/05; H02G 7/053; H02G 7/20; B66D 3/04
  USPC ........ 254/134.3 PA, 395, 415, 409; 29/897.1
  See application file for complete search history.

(56) References Cited

U.S. PATENT DOCUMENTS

| 3,179,376 A | * | 4/1965 | Botten | B66D 3/06 |
| | | | | 254/401 |
| 3,545,724 A | | 12/1970 | Wright | |
| 3,705,708 A | * | 12/1972 | Cunningham | B66D 3/04 |
| | | | | 254/409 |
| 3,844,536 A | | 10/1974 | Chadwick, Jr. | |
| 4,423,853 A | | 1/1984 | Davis | |
| 5,533,710 A | | 7/1996 | Sauber | |
| D438,779 S | | 3/2001 | Sauber | |
| 6,517,052 B1 | | 2/2003 | Lake | |
| 9,279,519 B2 | | 3/2016 | Boisclair | |
| 2015/0014509 A1 | * | 1/2015 | McKay | F16L 3/01 |
| | | | | 248/558 |

FOREIGN PATENT DOCUMENTS

WO    WO2013126506 A1    8/2013

OTHER PUBLICATIONS

Reliable Equipment & Service Co., Inc., REL-SB7 https://www.reliable-equip.com/wp-content/uploads/2018/08/REL-SB7-and-REL-SBCAB.pdf.
Sherman+Reilly, UG-73 https://sherman-reilly.com/news/products_list/ug-73/.
Sherman+Reilly Underground Array Block https://sherman-reilly.com/news/products_list/underground-array-block-2/.

(Continued)

*Primary Examiner* — Tyrone V Hall, Jr.
*Assistant Examiner* — Seahee Hong
(74) *Attorney, Agent, or Firm* — Scott Swanson; Shaver & Swanson, LLP

(57) ABSTRACT

A connector for connecting a roller to a base for extending a conductor over a span for electrical distribution or sub transmission. The connector is configured to work with pre existing or standard rollers such as a Universal Stringing Roller as well as with embodiments of the inventor's SAR roller, disclosed in a contemporaneously filed United States non-provisional patent application. The connector allows for use of a rotating base disclosed in the contemporaneously pending United States patent application that allows for adjustment of the stringing roller without having to disconnect the stringing roller from the base, whereas in prior stringing roller to base configurations the stringing roller was required to be removed from the base, the string roller rotated, and the stringing roller attached to the base at a new position, typically a flange, on the stringing roller.

11 Claims, 4 Drawing Sheets

(56) References Cited

OTHER PUBLICATIONS

Sherman+Reilly Underground Jamb Skid https://sherman-reilly.com/news/products_list/underground-jamb-skid/.
Utility Pipe Supply Fiber Optic Hanger Block https://www.utilitypipesupply.com/product/fiber-optic-hanger-block/.
Tallman Equipment Co., Inc. 3 Sheave Corner Cable Guide https://www.tallmanequipment.com/products/3-sheave-corner-cable-guide/8539800/.
Linestar Underground Blocks, UG-73; UG-71, UG-72, UG-76-QB, S+R Model JSEA https://linestar.ca/pulling-lifting/lifting/blocks/underground-blocks/.
Bethea Tool and Equipment Company, Universal Roller, Sep. 2016.
TSE International, 6707 Universal Stringing Block https://tse-international.com/?wpdmdl=1209.
Bethea Tool and Equipment Company, Angle Block BTUG-24-5-UL.
Bethea Tool and Equipment Company UB1A.
Tallman Equipment Inc. catalog.
Tallman Equipment Inc. Universal Helicopter Blocks https://www.tallmanequipment.com/products/universal-helicopter-blocks/.
Sherman+Reilly XS-100-B Universal Stringing Block https://www.techtoolsupply.com/Sherman-Reilly-XS-100-B-Universal-Stringing-Block-p/gre-52075509.htm.

* cited by examiner

BLOCK CONNECTOR AND BASE

TECHNICAL FIELD

This invention relates to electrical power and sub transmission. More particularly, it relates to a connector for stringing conductors for electrical power for new construction or rebuild of existing circuits.

BACKGROUND

Electric power distribution is the final stage of the power delivery system before voltage gets stepped down to useable secondary voltage (120/240) (277/480) 480 volts to customer's meters.

Electricity is created at generation facilities across the world. In the US, voltage is generated at 13.8 kv to 24 kv and immediately stepped up to high higher transmission voltages, up to 500 kv and higher. The use of transformers helps make this happen where the voltages are stepped up and down.

The generation stations in the US are tied together through transmission systems referred to as "the Grid". Transmission systems move large quantities of power over long distances at higher voltages to transmission substations where the voltage is stepped down to lower voltages.

The lower voltage is referred to as sub transmission voltage ranging from 44 kv to 138 kv. The sub transmission structures are smaller and easier to install in populated areas. Some sub transmission is used to deliver power to large industrial customers.

Distribution substations are fed by sub transmission circuits where with the use of transformers, the voltage is stepped down to 2 kv up to 34.5 kv where it then leaves the substation and goes to residential neighborhoods.

When a new conductor is introduced into the electrical distribution system, whether it be transmission, sub transmission or distribution, there is a need to run the wires from structure to structure. The structures can be either wood poles, metal poles, lattice towers or fiberglass poles. Most often on main lines, the structure will have four (4) conductors on each pole and sometimes double circuits that could be eight (8) or more conductors. The wires or conductor might run one to two (1-2) miles in town or about forty (40) poles per mile. In town distribution poles have an average spacing of about 132 feet. Line workers install rollers on top of a crossarm or utility arm or hang under an insulator to pull in rope that pulls in the new conductor. The term roller as used herein is used to define blocks with single rollers (such as those that have the appearance of a pulley as well as the inventor's SAR which has a series of rollers as opposed to a single pulley). When there are existing energized conductors on the crossarm or utility arm, line workers have to move the conductors while they are energized to fiberglass temp arms that attach to existing crossarm or utility arms. The reason for this step is to make room to install the rollers to the crossarm or utility arm to pull in the conductor.

The rollers that are used today are aluminum construction, which is a conductive material. When the line workers are installing, they are very close to energized existing conductors. There have been many cases in the US where the line workers are injured due to contact with energized parts in their work zone. If the angle needs to be corrected after stringing operation starts the worker needs to remove the conductor, fix the angle on the roller and then reinstall the conductor in the roller. The current invention can be used to adjust the angle while the conductor is installed making the task safer for the worker. The current invention can be utilized with electrical line or other utility lines including, but not limited to fiber optic lines. Any line that can be run through the roller to provide electricity or conduct a signal is referred herein as a "utility line." The connector will allow a variety of new and old blocks, such as the SAR disclosed by the invention in U.S. application Ser. No. 16/595,447 or other prior art blocks.

In light of the foregoing, there is a need for an improved base and/or connector capable of attaching to prior stringing rollers in order to allow for adjustment of the position of the stringing roller relative to the base without detaching the stringing roller from the base. Preferably the connector will allow for a variety of block or roller styles to be mounted to it.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a connector for connecting a utility line roller to a base. The connector is preferably in a U-shape. The connector has a socket for mating engagement with a flange of a utility line roller. The flange of the utility line roller is positioned within the socket. A first pin or bolt secures the flange of the utility line roller to the connector through a first opening in the connector.

The connector has a second opening configured for placement of a second pin through the second opening. The second opening is configured to line up with a series of rotational locating openings in a base. The connector is configured to rotate on the base at a pivot. The pivot can be a bolt, bearing, pivot pin, or other mechanism that allows the connector to pivot on the base. The series of rotational locating openings in the base are positioned to secure the rotation of the connector about the pivot as different orientations about the base. This allows for the orientation of the roller to be changed about the base without the need to remove the roller from the connector and/or base. The connector coupled with the base.

In a preferred embodiment the socket is positioned on the connector opposite of an apex of a curve defining said U-shape. In a preferred embodiment the socket is defined by two opposing walls and a floor. The floor preferably has a contour matching the flange of a utility roller.

The base is configured as a base or platform that is positioned on a utility pole or crossarm. The connector can be configured to be removably attached to the base or permanently attached to the base. The base preferably comprises two opposing extensions. A strap pin extends between the two opposing extensions and is configured for attachment to a strap configured to attach the base to a utility pole. The strap is preferably attached to the base to form an endless loop that attaches to a utility pole. In a preferred embodiment the strap has a ratchet configured to adjust the circumference of the endless loop. The ratchet can be configured as a lever operated ratchet or with a stud or bolt end that is configured for a socket of a wrench, including a power wrench, can be utilized to adjust the circumference of the endless loop. The base can include an adapter that is curved to generally match the curvature of the circumference of a utility pole or crossarm. Alternatively the base can be shaped to match the curvature of the circumference of a utility pole or crossarm.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
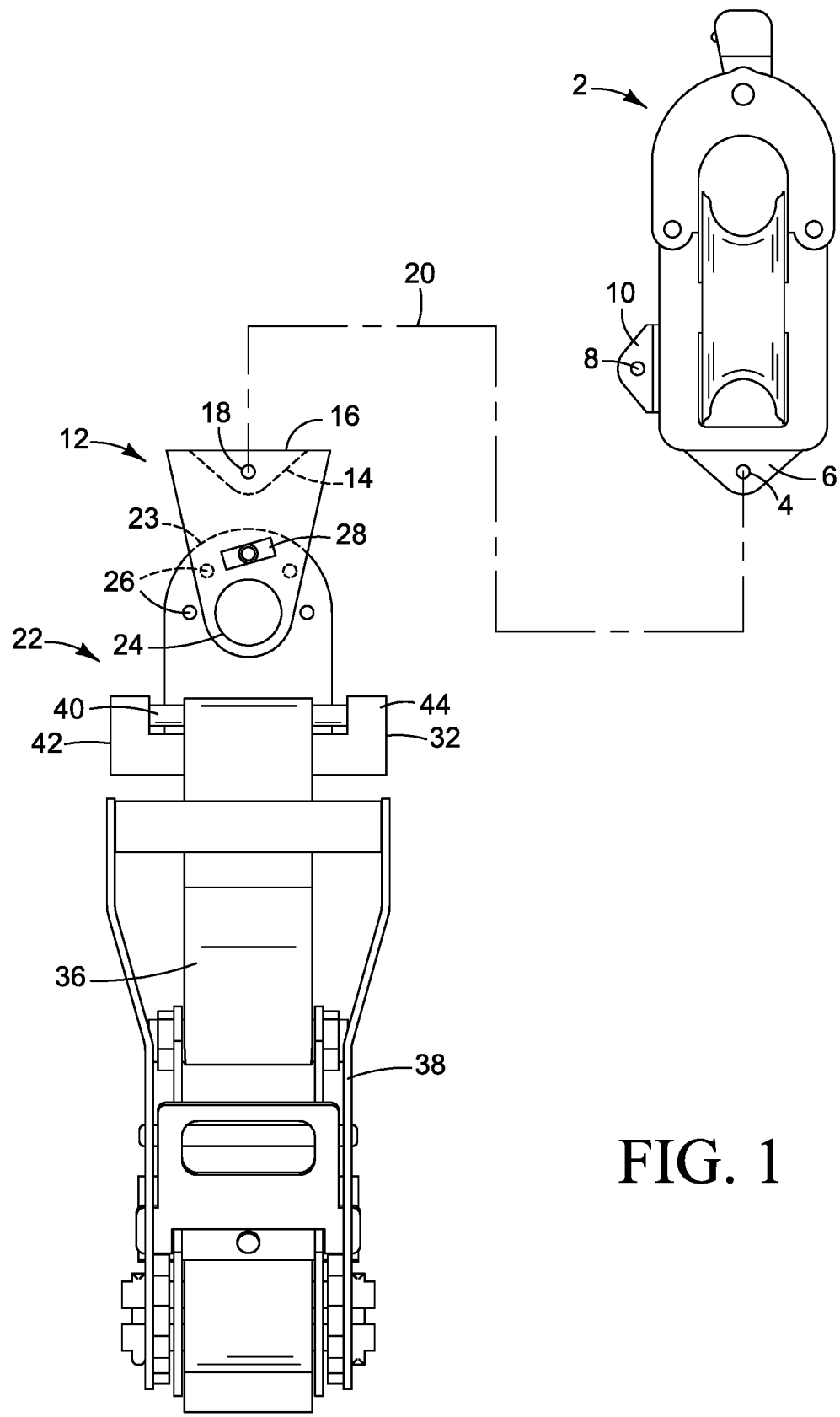
FIG. 1 is a partially exploded end view of a prior art roller and an embodiment of the invention.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a prior art roller 2 and a connector of the present invention. The connector is configured for attaching the prior art roller to a base allowing for rotation of the prior art roller about the base. The base is disclosed in co-pending U.S. patent application Ser. No. 16/595,447, the contents of which are herein incorporated by reference. The prior art roller traditionally utilizes to connection flanges 6, 10 to connect to a base for mounting on a utility pole or cross beam. In order for the orientation of the roller to be changed, the entire roller must be detached from the base, the roller rotated, and the roller re-attached at a different flange on the perimeter of the roller. The prior art roller of FIG. 1 provides for two flanges, while other prior art rollers may have more than two flanges. The connection flanges have openings 4, 8 through which a first pin or bolt (referred to collectively as a pin herein) is positioned to secure the prior art roller to a base.

The connector 12 is configured with a socket 16 that is configured to receive the connector flanges 6, 10 of the prior art roller to secure the roller to the base. The connector as shown is configured in a generally U shape. The internal configuration of the socket preferably matches the contour of the flange of industry standard rollers. FIG. 1 is depicted with a floor of the socket matching the profile of the flanges 6, 10 of the prior art roller.

The connector has two openings or holes configured for placement through each of separate pins. The first opening 18 is configured to receive a pin there through to attach a roller to the connector. A first pin (shown in FIGS. 2-4) is positioned through the opening 18 in a first side of the wall of the socket of the connector, through the opening 4 or 8 of the prior art roller, and through an opening in a second side of the socket wall to attach the prior art roller to the connector. The connector is configured with a second opening (shown only with a pin therethrough) having pin 28 inserted through the opening. Pin 28 is configured for placement through the opening in the connector and through one of a series of openings 26 in the base to secure the connector and lock in pivot position. In the illustrated embodiment the base has five openings allowing for positioning the roller in five orientations relative to the base. The connector is configured to rotate about the base 22 via pivot 24. In a preferred embodiment the pivot is a pivot pin, bolt, bearing or other connector that extends through the connector and base to attach the connector to the base and provide for pivoting rotation of the connector on the base.

The U-shaped base Extend outward from a mounting platform 32. A mounting strap 36 is attached to the mounting platform 32 via a pin 40. The strap is current figured to be placed around a utility pole or crossbeam and tightened and released via ratchet 38. The pin is configured to attach to the base at two extensions 42, 44 from the base.

Figure 2:
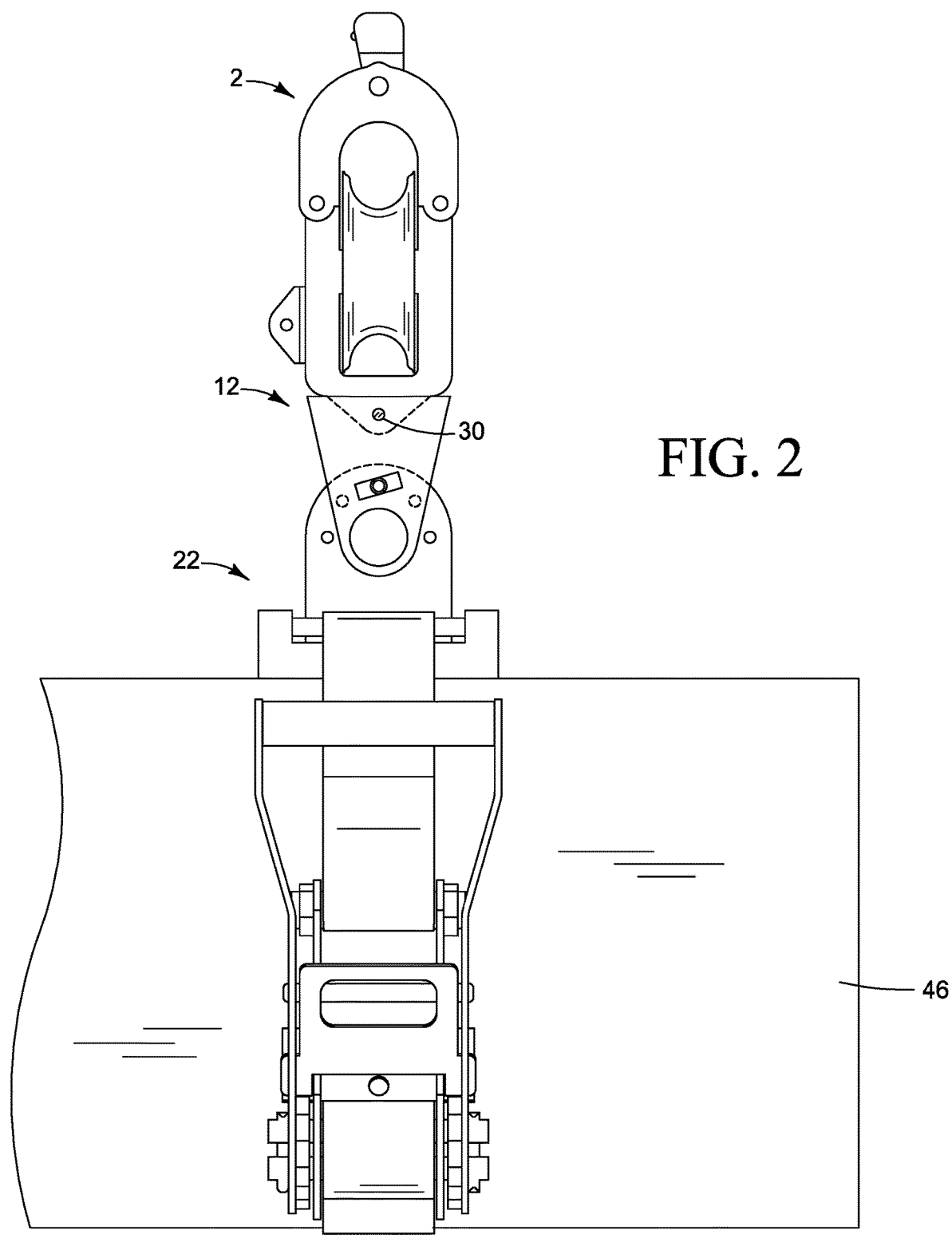
FIG. 2 is an end view of the embodiment of the invention of FIG. 1, as attached to a cross beam, having a prior art roller attached vertically to the invention.

FIG. 2 illustrates a prior art roller 2 attached to a connector 12. The connector as illustrated is generally in a vertical position relative to the base 22. A first pin 30 is inserted through the opening in the front of the socket connector (shown as 18 in FIG. 1), through the opening (shown as 4 in FIG. 1) in the flange (shown as 6 in FIG. 1) of the prior art roller and through the opening in the second side of the socket wall to attach the prior art roller to the connector. The base is attached via the strap to a crossarm 46.

Figure 3:
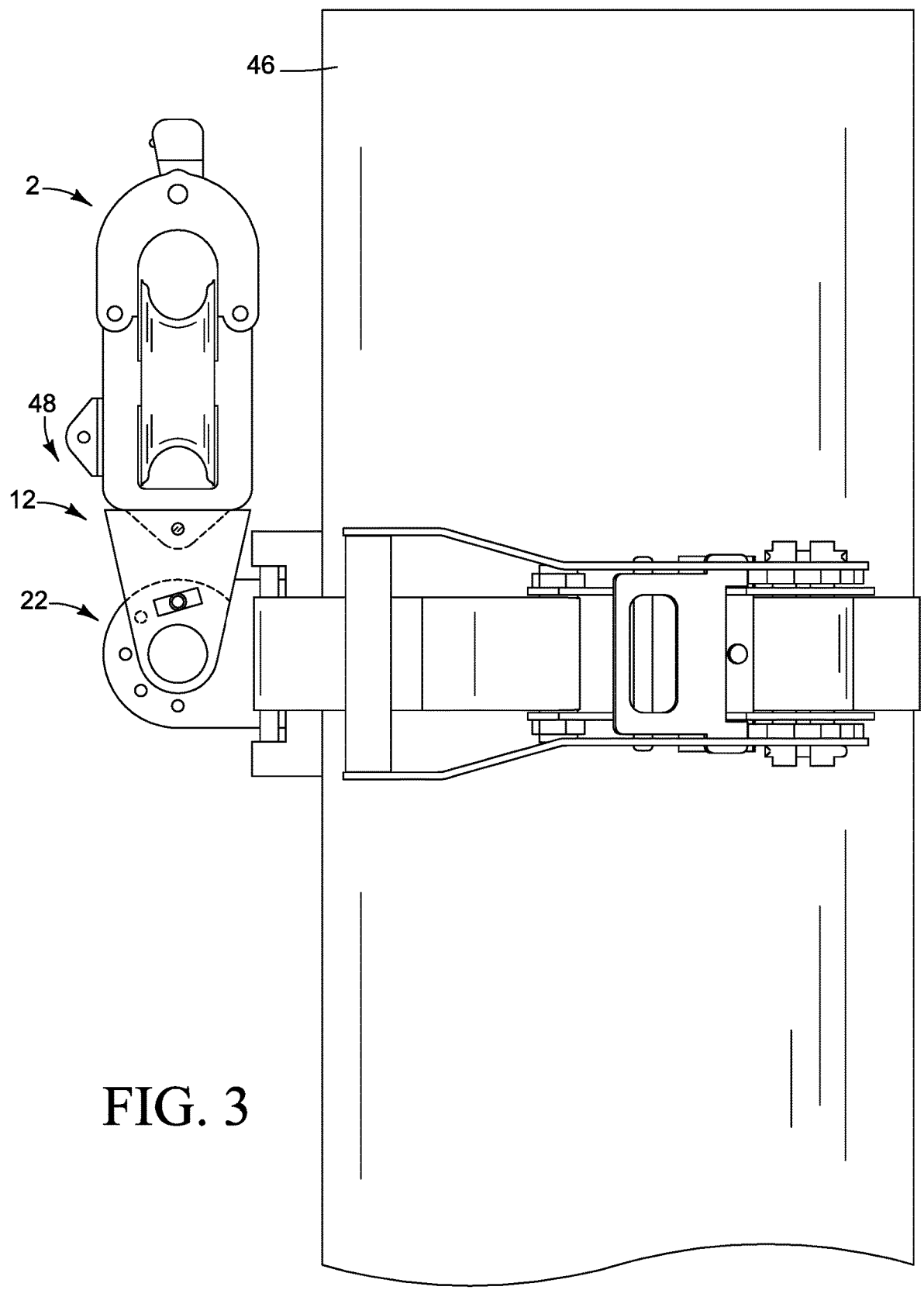
FIG. 3 is an end view of the embodiment of the invention of FIG. 1, as attached to a pole, the prior art roller attached to the invention, with the embodiment of the invention and roller rotated vertically.

FIG. 3 illustrates a prior art Roller attached to an embodiment of a connector. The connector is rotated on the hinge pin at a 90° angle to the base 22. A pin has secured the connector in position on the base.

Figure 4:
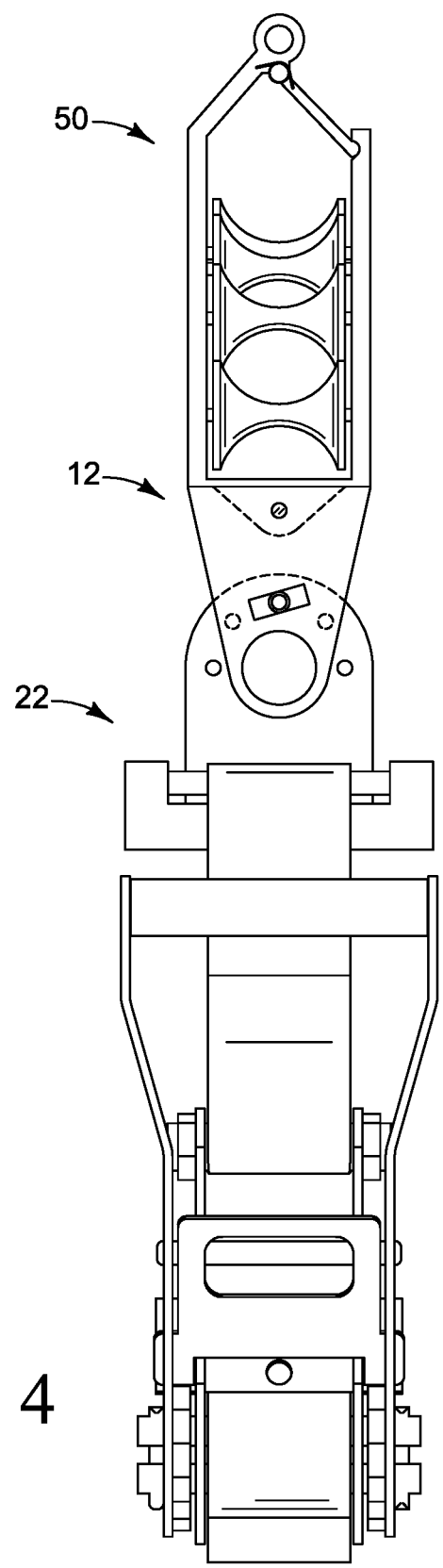
FIG. 4 is an end view of an embodiment of the invention, as attached vertically to a SAR roller.

FIG. 4 illustrates an embodiment of a roller disclosed in U.S. patent application Ser. No. 16/595,447 attached to an embodiment of an embodiment of a connector mounted to a base disclosed U.S. patent application Ser. No. 16/595,447. The roller of FIG. 4 utilizes a flange projecting from the base of the roller, similar to the prior art roller. For rotational adjustment of the roller about the base by rotation around the pivot pin extending through the adapter and base.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A connector and base assembly for connecting a utility line roller to a base, wherein said connector and base assembly comprising:

a connector, wherein said connector defines a socket configured for mating engagement with a flange of the utility line roller, wherein said connector comprises a first opening configured or placement of a first pin through said first opening and through a flange of the utility line roller to lock the utility line roller in said socket;

wherein said base is pivotally connected to said connector at a first end of said connector such that said connector is connected to said base by a pivot, wherein said connector is configured for pivotal rotation about said base at said pivot, wherein said base comprises a series of rotational openings each configured for alignment with a second opening of said connector to lock said connector in a different rotational position for each of said rotational openings;

wherein placement of a second pin through said second opening of said connector and through one of said rotational openings of said base locks said connector in the rotational position, wherein said base is configured for attachment to a utility pole.

2. The connector and base assembly of claim 1, wherein said connector comprises a generally U-shape.

3. The connector and base assembly of claim 2, wherein said socket is positioned on said connector opposite of an apex of a curve defining said U-shape.

4. The connector and base assembly of claim 1, wherein said first pin comprises a bolt.

5. The connector and base assembly of claim 1, wherein said second pin comprises a bolt.

6. The connector and base assembly of claim 1, wherein said base comprises a platform configured for positioning on the utility pole.

7. The connector and base assembly of claim 6, wherein said base comprises two opposing extensions, wherein said base comprises a strap pin extending between said two opposing extensions and configured for attachment to a strap configured to attach said base to the utility pole.

8. The connector and base assembly of claim 7, wherein said strap comprises a ratchet configured for adjustment of a length of said strap configured for attachment to the utility pole.

9. The connector and base assembly of claim 6, wherein said base is connected to a strap, wherein said strap and said base define an endless loop configured for attachment to the utility pole.

10. The connector and base assembly of claim 1, wherein said pivot comprises a pivot pin connecting said connector and said base and configured such that said connector rotationally pivots on said base at said pivot pin.

11. The connector and base assembly of claim 1, wherein said socket is at an opposite end of said connector from said pivot connecting said connector to said base.

* * * * *